(12) United States Patent
Kolof et al.

(10) Patent No.: US 8,290,094 B2
(45) Date of Patent: Oct. 16, 2012

(54) METHODS AND SYSTEMS FOR MEASURING DATA PULSES

(75) Inventors: Andreas Kolof, Peiting (DE); Dietmar König, Munich (DE)

(73) Assignee: Infineon Technologies AG, Neubiberg (DE)

(*) Notice: Subject to any disclaimer, the term of this patent is extended or adjusted under 35 U.S.C. 154(b) by 361 days.

(21) Appl. No.: 12/689,088

(22) Filed: Jan. 18, 2010

(65) Prior Publication Data

US 2011/0176589 A1 Jul. 21, 2011

(51) Int. Cl.
*H04L 27/06* (2006.01)
(52) U.S. Cl. ........ 375/340; 375/224; 375/316; 375/343; 375/354; 370/503; 370/508; 370/509; 370/510; 370/511; 370/512; 370/513; 370/514; 455/130; 455/502; 327/141; 341/122; 329/361
(58) Field of Classification Search ............. 375/224, 375/316, 340, 343, 354; 455/130, 502; 370/503, 370/508, 509, 510, 511, 512, 513, 514; 327/141; 341/122; 329/361
See application file for complete search history.

(56) References Cited

U.S. PATENT DOCUMENTS 5,969,631 A * 10/1999 Ammler et al. ............... 370/514

FOREIGN PATENT DOCUMENTS

EP 0813321 A2 12/1997

OTHER PUBLICATIONS

SAE International. Surface Vehicle Information Report. "Single Edge Nibble Transmission for Automotive Applications." Feb. 2008 revision. www.sae.org. 27 Pages.

* cited by examiner

*Primary Examiner* — Leon Flores
(74) *Attorney, Agent, or Firm* — Eschweiler & Associates, LLC

(57) ABSTRACT

Some embodiments disclosed herein relate to a method. In the method, a duration of a first synchronization pulse is measured. A fixed, predetermined number of ticks are equally spaced at a first time interval over the first sync pulse, regardless of the duration of the first synchronization pulse. A duration of a first data pulse is then measured by periodically incrementing a tick count value at the first time interval during the entire duration of the first data pulse. The tick count value at an end of the first data pulse is then correlated to a first digital value encoded on the first data pulse.

14 Claims, 6 Drawing Sheets

METHODS AND SYSTEMS FOR MEASURING DATA PULSES

BACKGROUND

In many systems, there is an on-going need to use multiple sensors to monitor and report data. For example, pedal position sensors, throttle position sensors, exhaust gas sensors, and barometric air pressure sensors, among others, can be used to help monitor and control engine activity in a vehicle. In the past, many of these sensors have communicated over separate busses and have required separate control circuitry to exchange data. The busses, which constitute a labyrinth of sorts for unwary repairmen, along with the associated control circuitry, add cost and complexity to the engine compartment of the vehicle.

To streamline vehicles and other types systems, communication protocols have been developed that allow one or more sensors to transmit according to a predetermined protocol over a single wire. Aspects of the present disclosure are directed toward improved techniques for measuring data pulses in these and other communication protocols.

DESCRIPTION OF THE DRAWINGS

FIGS. 7-8 show more detailed views of how the receiver can implement a relatively high baud rate and where FIGS. 9-10 show more detailed views of how the receiver can implement a relatively low baud rate.

DETAILED DESCRIPTION

Figure 1:
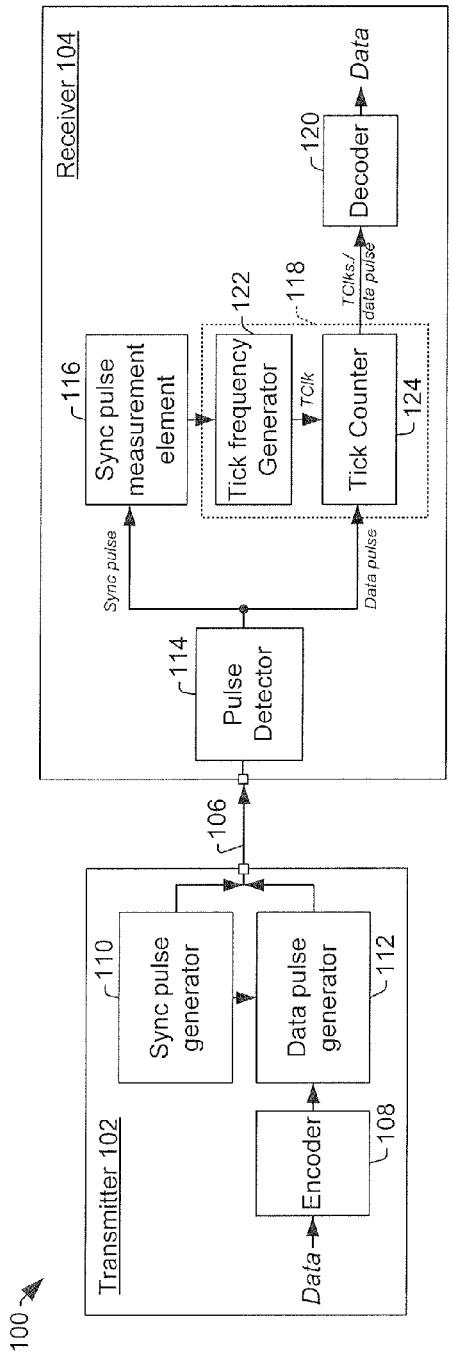
FIG. 1 is a block diagram illustrating a communication system that includes a transmitter and receiver in accordance with some embodiments.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. For example, although the embodiments are described below with respect to the Single-Edge-Nibble Transmission (SENT) protocol, the invention may also find utility in other communication protocols.

In previous SENT communication systems, receivers have determined data pulse durations by performing oversampling. In oversampling, a receiver measures a voltage magnitude of a data pulse at a plurality of points on the data pulse in rapid succession, and then tabulates these voltage measurements to determine the shape and duration of the data pulse. This takes a considerable amount of data processing. For a receiver hoping to respond to a transmitter request as quickly as possible, this excessive data processing can act as a bottleneck in communication. In addition, the circuitry required to implement such data processing can increase the cost point of the receiver.

In view of these considerations, the inventors have fashioned receivers that use improved techniques for determining the duration of a data pulse. In particular, the techniques disclosed herein determine a tick frequency defined by a duration of a synchronization (sync) pulse, which is made up of a known number of ticks that are equally spaced over the sync pulse. The receiver then counts ticks in a subsequent data pulse by setting a tick counter to increment at the tick frequency during the entire data pulse duration. The number of ticks in the data pulse can be decoded to correspond to a particular digital data value. Because these techniques do not require oversampling to measure a data pulse duration, the inventive receivers potentially improve performance and reduce costs relative to previous solutions.

Turning now to FIG. 1, one can see a communication system 100 (e.g., SENT communication system) in accordance with some embodiments. The communication system 100 includes a transmitter 102 and a receiver 104, each of which includes an interface for communicating over a transmission channel 106 (e.g., a single wire). On one side of the channel 106, the transmitter 102 includes an encoder 108, a synchronization (sync) pulse generator 110 and a data pulse generator 112. One the other side of the channel 106, the receiver 104 includes a pulse detector 114, a sync pulse measurement element 116 and a data pulse measurement element 118. The data pulse measurement element 118 is coupled to a decoder 120 and includes a tick frequency generator 122 and a tick counter 124.

Figure 2:
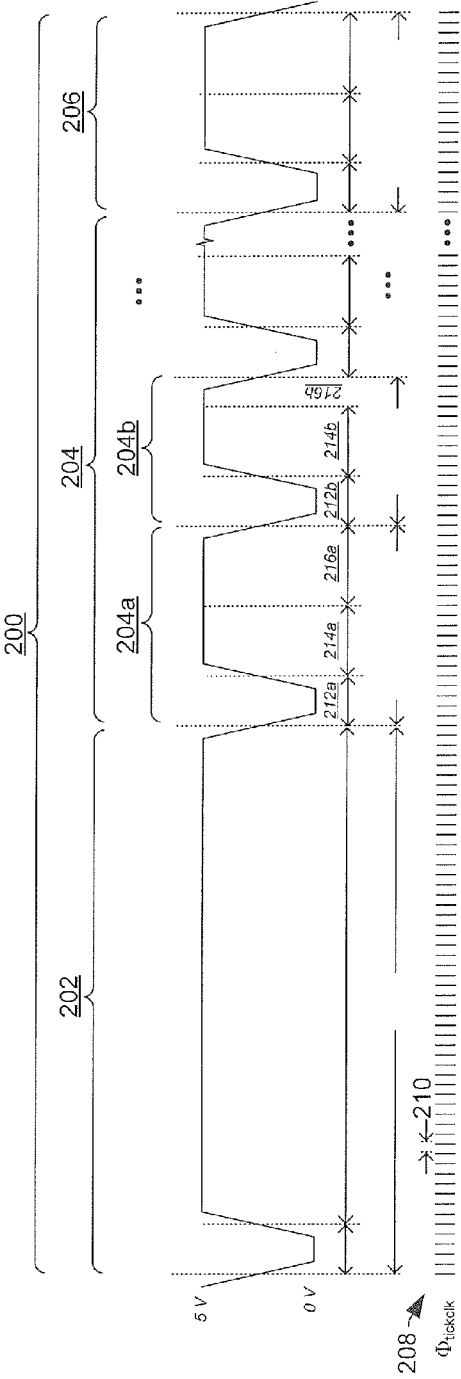
FIG. 2 is a waveform diagram of a data transmission unit that can be transmitted from a transmitter to a receiver.

During communication, the transmitter 102 sends data to the receiver 104 using a communication protocol made up of data transmission units, such as shown in FIG. 2. A data transmission unit 200 includes a synchronization (sync) pulse 202, a number of data pulses 204, and a cyclic redundancy check (CRC) pulse 206. Underlying each type of pulse are flexible time units referred to as "ticks" 208. The time interval 210 between successive ticks, which corresponds to a tick frequency, is set by a duration of the sync pulse 202 and is used to encode subsequent data and CRC pulses 204, 206. Thus, after the transmitter 102 sets the tick frequency by transmitting the sync pulse with a suitable duration, the receiver 104 can use the tick frequency to count the number of ticks 208 in data pulse(s) 204 and CRC pulse 206. Because the number of ticks 208 in each data pulse corresponds to a separate digital value, the data pulses 204 can collectively be used to transmit a message from the transmitter 102 to the receiver 104.

To accomplish this general functionality, the transmitter 102 selects a desired data (or "baud") rate prior to transmission. The sync pulse generator 110 then transmits sync pulse 202 to have a duration indicative of the selected data rate. Because each sync pulse has a fixed, predetermined number of ticks (e.g. 56 ticks) spread over its duration and because successive ticks are separated by regularly repeating time interval 210 for a given sync pulse, a change in the duration of the sync pulse 202 indicates a change in the tick frequency and a corresponding change in the data rate.

After the sync pulse 202 is sent, thereby establishing the tick frequency for the data transmission unit 200, the data pulse generator 112 in transmitter 102 starts sending data pulses 204. The duration of each data pulse, as measured by the number of ticks, corresponds to a multi-bit value encoded thereon. For example, first data pulse 204*a* has a 4-bit nibble value of "8" encoded thereon, and second data pulse 204*b* has a 4-bit nibble value of "3" encoded thereon. The CRC pulse 206 is transmitted in a similar manner.

To properly receive and decode this transmitted message, the receiver 104 first receives the sync pulse 202. Upon receipt of the sync pulse 202, the pulse detector 114 notifies the sync pulse measurement element 116 that a sync pulse 202 is present. The sync pulse measurement element 116 determines the sync pulse duration and programs the tick frequency generator 122 to regularly pulse at time interval 210, thereby reproducing the tick frequency.

Once the tick frequency is reproduced, the receiver 104 is ready to measure a data pulse duration. To accomplish this, the pulse detector 114 first notifies the data pulse measurement element 118 that a data pulse is present. The data pulse measurement element 118 then "counts" the number of ticks in the received data pulse by incrementing the tick counter 124 at each time interval 210 generated by the tick frequency generator 122 so long as the data pulse is present. At the end of the data pulse, the number of ticks stored in the tick counter 124 is captured. Decoder 120 then decodes the captured number of ticks, thereby allowing the receiver 104 to recover the transmitted data value. The tick counter 124 is then reset before the start of the next data pulse, so the next data pulse can be decoded in a similar manner.

Note that this technique for measuring data pulses does not require oversampling. Instead, the tick counter 124 in the receiver 104 is incremented at the tick frequency provided by the tick frequency generator 122. Therefore, the inventive techniques potentially improve performance and cost by reducing complexity involved with measuring duration of data pulses.

To illustrate one encoding/decoding technique that can be used, FIG. 2 has been illustrated such that each data pulse (204a, 204b, . . . ) starts with a low pulse (212a, 212b, . . . , respectively) that is held low for a predetermined number of ticks (e.g., 5 ticks). After this low-pulse, each data pulse (204a, 204b, . . . ) is then pulsed high (214a, 214b, . . . , respectively) for at least a minimal number of ticks (e.g., 7 ticks). Thus, in FIG. 2's example, each data pulse has a minimum length (e.g., 12 ticks). The remainder of the data pulse duration (e.g., 216a, 216b, . . . ) corresponds to the data value encoded on that data pulse. For example, the first data pulse 204a stays high for eight additional ticks 216a, which could correspond to a data value of "8" (e.g., expressed as a 4-bit nibble "1000"); while the second data pulse 204b stays high for three additional ticks 216b, which could correspond to a data value of "3" (e.g., expressed as a 4-bit nibble "0011"), and so on.

Figure 3:
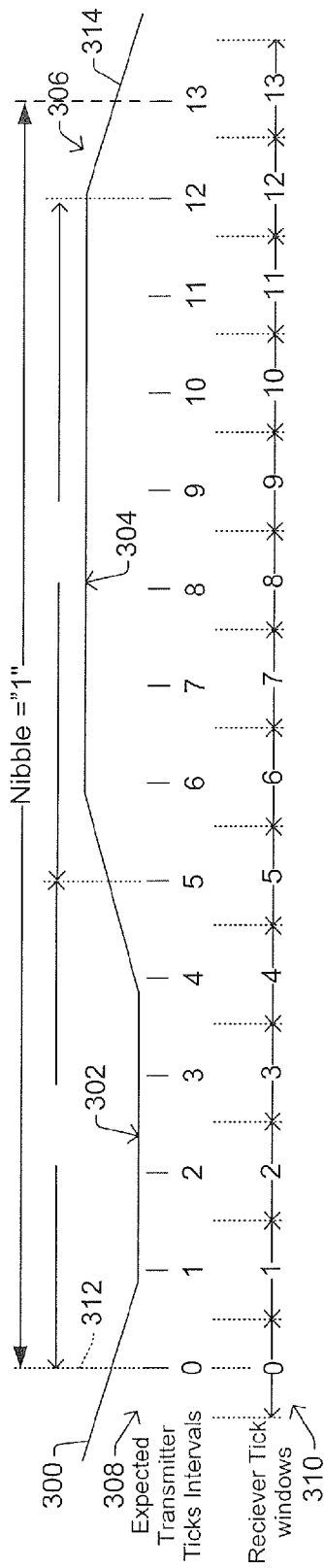
FIG. 3 is a data pulse with regards to an expected transmitter tick interval and a receiver tick window.

Turning now to FIG. 3, one can see another embodiment in which a duration of a data pulse 300 is measured. Consistent with FIG. 2's example, this data pulse 300 starts with a low pulse 302 that is held low for a predetermined number of ticks (e.g., 5 ticks), and then proceeds to a high pulse 304 that remains high for at least a minimal number of ticks (e.g., 7 ticks). The remaining one tick 306 after the high pulse 304 indicates the data value transmitted in the data pulse (e.g., a multi-bit data value of "0001").

The notable thing about FIG. 3 is that the manner in which the receiver counts ticks by using an expect transmitter tick interval 308 and a receiver tick window 310, which are offset relative to one another. In particular, the receiver expects the transmitter to measure tick intervals from a time 312 corresponding to a transition voltage indicating the start of the data pulse 300. The receiver, by contrast, increments its tick counter (e.g. tick counter 124 in FIG. 1) approximately halfway between expected transmitter tick intervals 308 according to the receiver tick window 310. This is advantageous in that it provides the receiver with better margins than if the receiver tick windows 310 were aligned to directly correspond to the expected transmitter tick intervals 308. For example, even if the transmitter transmits falling edge 314 a little earlier or a little later than the receiver expects in the expected transmitter tick window 308, the receiver will still count a value of "13" ticks for the duration of the data pulse 300 because the receiver tick window 310 is centered about the expected transmitter tick interval "13".

Figure 4:
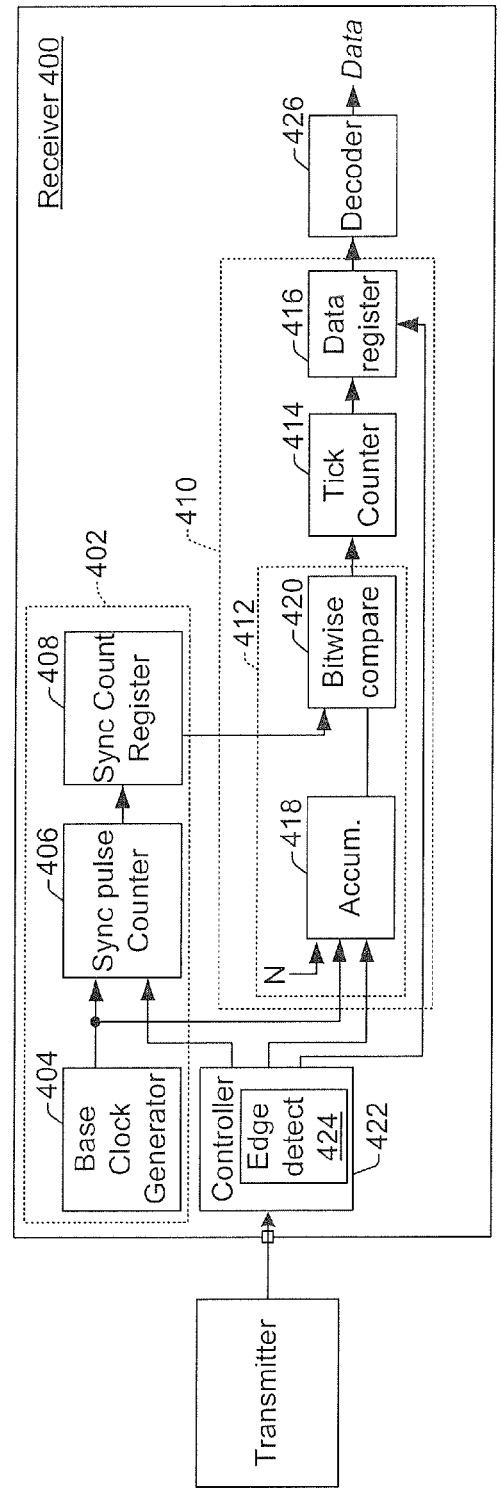
FIG. 4 is a block diagram illustrating a receiver in accordance with some embodiments.

FIG. 4 shows a more particular embodiment of a receiver 400 that includes a sync pulse measurement element 402 made up of a base clock generator 404, a sync pulse measurement counter 406, and a sync count register 408. The receiver 400 also includes a data pulse measurement element 410, which includes a tick frequency generator 412, a tick counter 414, and a data register 416. The tick frequency generator 412 includes an accumulator 418 coupled to the base clock generator 404 and a bitwise comparison element 420 coupled to the sync count register 408. A controller 422, which includes an edge detector 424 (e.g., falling edge detector), is also operably coupled as shown.

When a sync pulse is received, the edge detector 424 via the controller 422 notifies the sync pulse measurement element. The sync pulse measurement counter 406 is then incremented at each pulse of a base clock signal generated by base clock generator throughout the entire duration of the sync pulse. At the end of the sync pulse, the sync count register 408 captures the number of base clock intervals in the sync pulse. For example, if the base clock is running at 16 MHz and the sync pulse is 168 µs in duration, the sync count register will capture a value of 2688.

When a data pulse is received so as to be associated with the sync pulse, the edge detector 424 via the controller 422 notifies the data pulse measurement element 410. The accumulator increments is preset to an initial value at the start of the data pulse, and is then incremented by the number of ticks (N) spread over a sync pulse at each pulse of a base clock throughout the entire duration of the data pulse. For example, if the base clock is running at 16 MHz and a data pulse is 36 µs in duration, the accumulator would be incremented by 56 upon each rising edge of the base clock (assuming 56 ticks are spread over the sync pulse).

In this manner, when the accumulator value reaches the value stored in the sync count register (here 2688), the bitwise comparator changes its output state, thereby signaling the start of the next tick interval. Thus, the output of the bitwise comparator 420 constitutes a tick clock of sorts.

So long as a data pulse is present, the tick counter 414 is incremented at each rising edge of the tick clock (i.e., at the tick frequency). At the end of the data pulse, the controller 422 sends a signal to data register 416 to capture the present value in the tick counter 414. In this way, the data register 416 captures the number of ticks in a given data pulse. The decoder 426 can then decode the number of ticks in the data pulse to retrieve the multi-bit data value encoded thereon.

In some embodiments, at the start of each data pulse, the accumulator 418 is set to one-half of the number of base clocks in the sync pulse. For example, assuming that the sync pulse measurement counter stores a value of 2688, the accumulator can be pre-set to 1344 at the start of the first data pulse. This causes the tick counter to increment at approximately half-way between expected transmitter tick intervals, as shown in FIG. 3 above.

Figure 5:
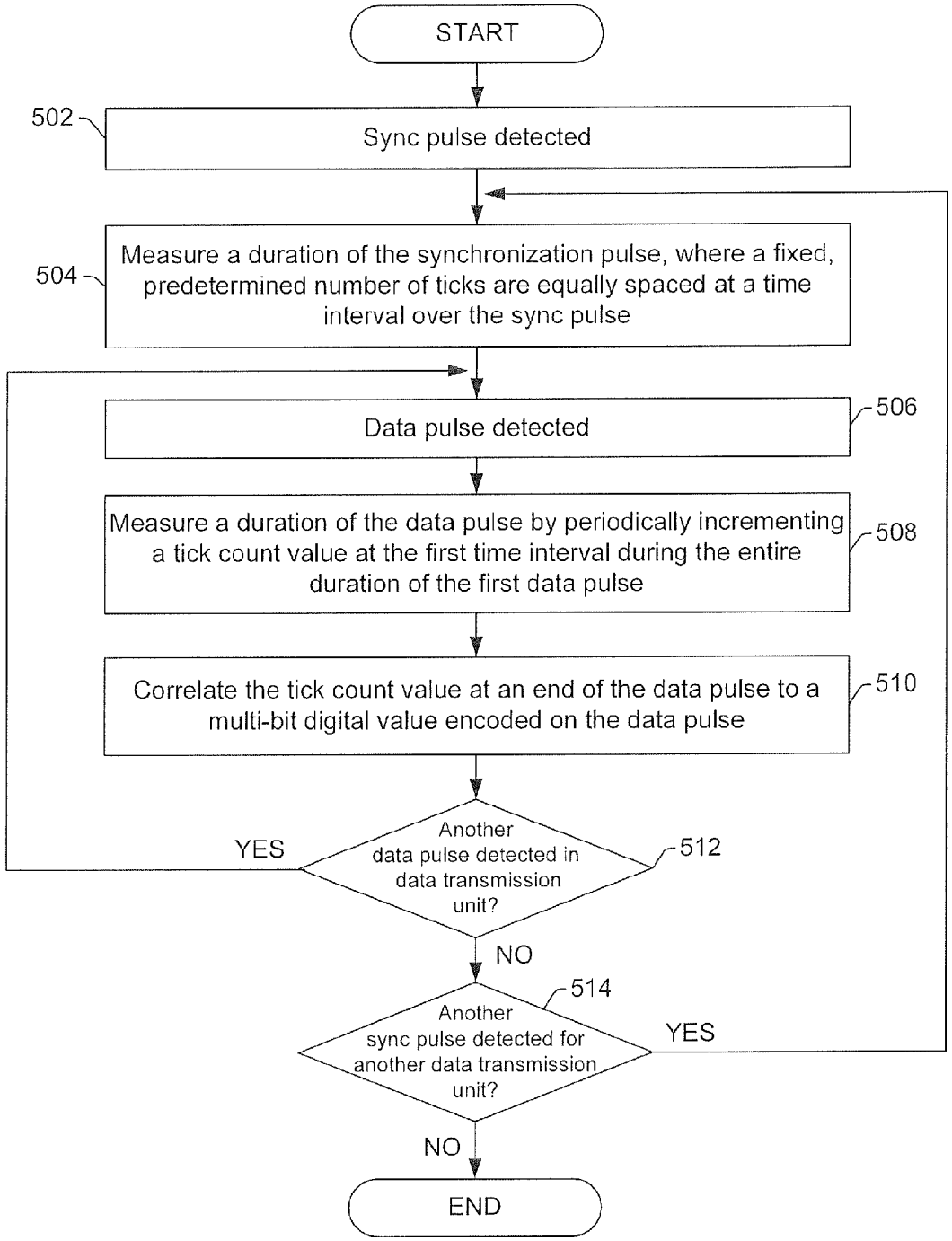
FIG. 5 is a flow chart depicting a method in accordance with some embodiments.

FIG. 5 shows a method 500 in accordance with some embodiments. While this method is illustrated and described below as a series of acts or events, the present disclosure is not limited by the illustrated ordering of such acts or events. The same is true for other methods disclosed herein. For example, some acts may occur in different orders and/or concurrently with other acts or events apart from those illustrated and/or described herein. In addition, not all illustrated acts are required and the waveform shapes are merely illustrative and other waveforms may vary significantly from those illustrated. Further, one or more of the acts depicted herein may be carried out in one or more separate acts or phases.

The method starts at 502, when the method detects the start of the sync pulse associated with a data transmission unit. In some embodiments, the start of the sync pulse can be indicated by a falling edge of a waveform, although it could also be indicated by a rising edge of a waveform in other embodiments.

At 504, the method measures a duration of the sync pulse, where a fixed, predetermined number of ticks are equally spaced at a time interval over the sync pulse. For example 56 ticks could be spread over each sync pulse in some embodiments. However, more the 56 ticks or less than 56 ticks could also be spread over each sync pulse in other embodiments.

At 506, a data pulse is detected for the data transmission unit. The start of the data unit can be indicated by a falling edge of a waveform, although it could also be indicated by a rising edge of a waveform in other embodiments.

At 508, the method measures a duration of the data pulse by periodically incrementing a tick count value at the first time interval during the entire duration of the first data pulse.

At 510, the method correlates the tick count value at an end of the data pulse to a multi-bit digital value encoded on the data pulse.

At 512, the method determines whether another data pulse is detected in the data transmission unit. If so ("YES" at 512), the method returns to 506-510 and measures the duration of the other pulse by using the time interval from the sync pulse in 504, then decodes the corresponding tick count value to arrive at a multi-bit digital value for the other pulse.

If another data pulse is not detected in the data transmission unit ("NO" at 512), the method proceeds back 514, where it is determines whether another sync pulse is detected for another data transmission unit. If another sync pulse is detected, the method returns to 504 and measures the duration of the sync pulse. One or more data pulses for the other data transmission unit can also be measured and decoded. In general each sync pulse have a different duration that sets a different time interval between ticks for different data transmission units. In this manner, the method can establish different data rates over time for different data transmission units.

WORKING EXAMPLE

Figure 6:
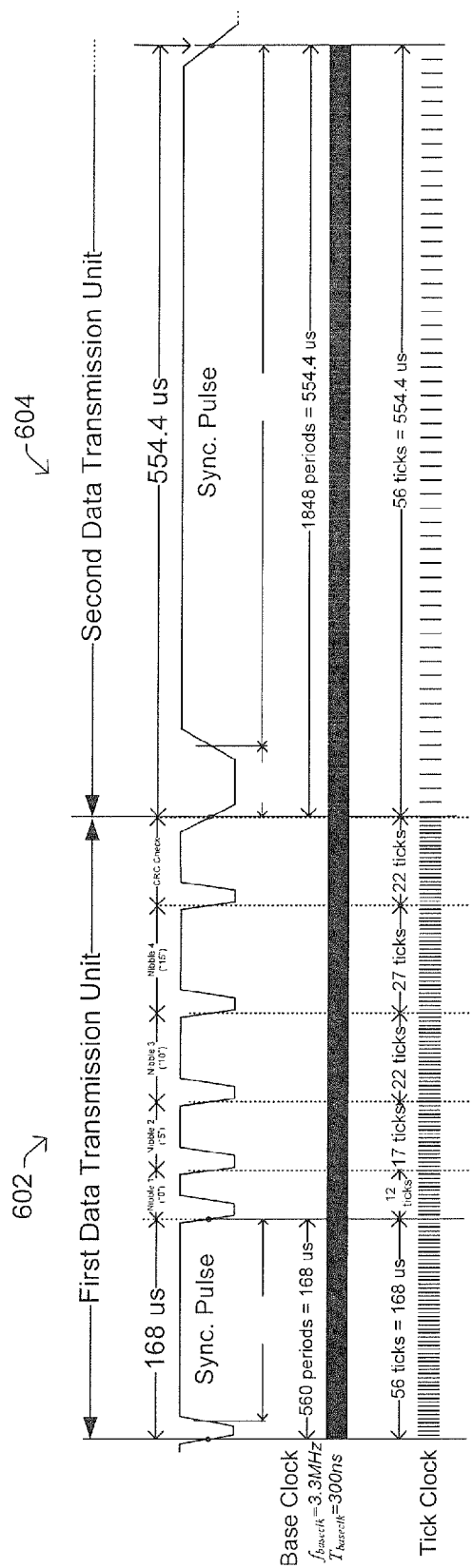
FIGS. 6-9 illustrate a working example of a receiver, where

FIGS. 6-10 collectively illustrate a working example that shows one manner in which a transmitter and receiver exchange data at a variable baud rate. FIG. 6 shows an overview, wherein a first data transmission unit 602 is transmitted at a relatively high baud rate, and wherein a second data transmission unit 604 is transmitted at a relatively low baud rate. Because of space limitations, the second data transmission unit 604 is only illustrated as a sync pulse, but it will be appreciated that the second data transmission unit 604 often include one or more data pulses and a CRC pulse (not shown). Notably, in the first data transmission unit 602, a relatively short sync pulse sets a relatively short time interval between ticks, which tends to promote a higher data rate. By contrast, in the second data transmission unit 604, a relatively long sync pulse sets a relatively long time between ticks, which tends to promote a relatively low data rate. In this working example, we assume that the receiver has a base clock that operates at 3.3 MHz, and that the transmitter and receiver both know that 56 ticks are to be spread over each sync pulse. Although various approximately numeric values are provided herein, it will be appreciated that these numeric values are merely examples should not be used to limit the scope of the disclosure. In addition, although only two data rates are shown, it will be appreciated that a transmitter and receiver can adaptively change between a continuum of data rates to achieve desired functionality.

Figure 7:
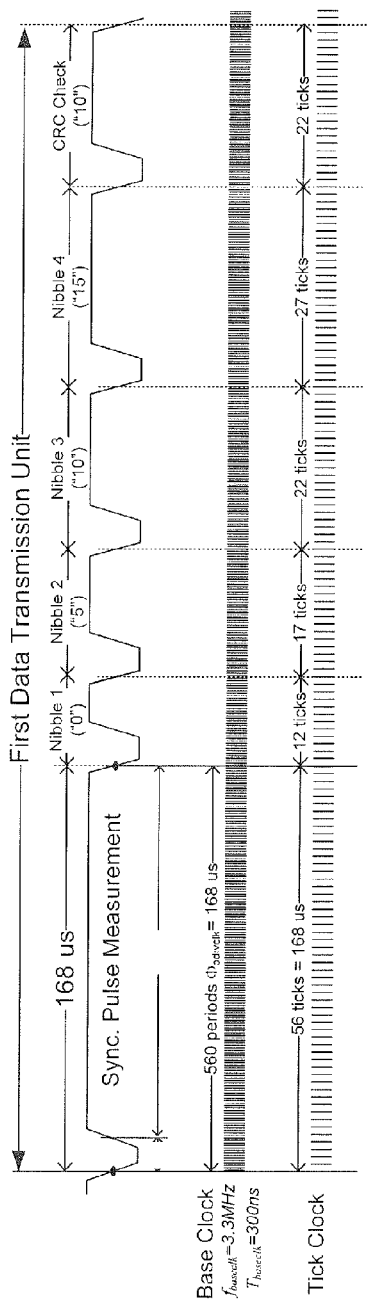
Figure 8:
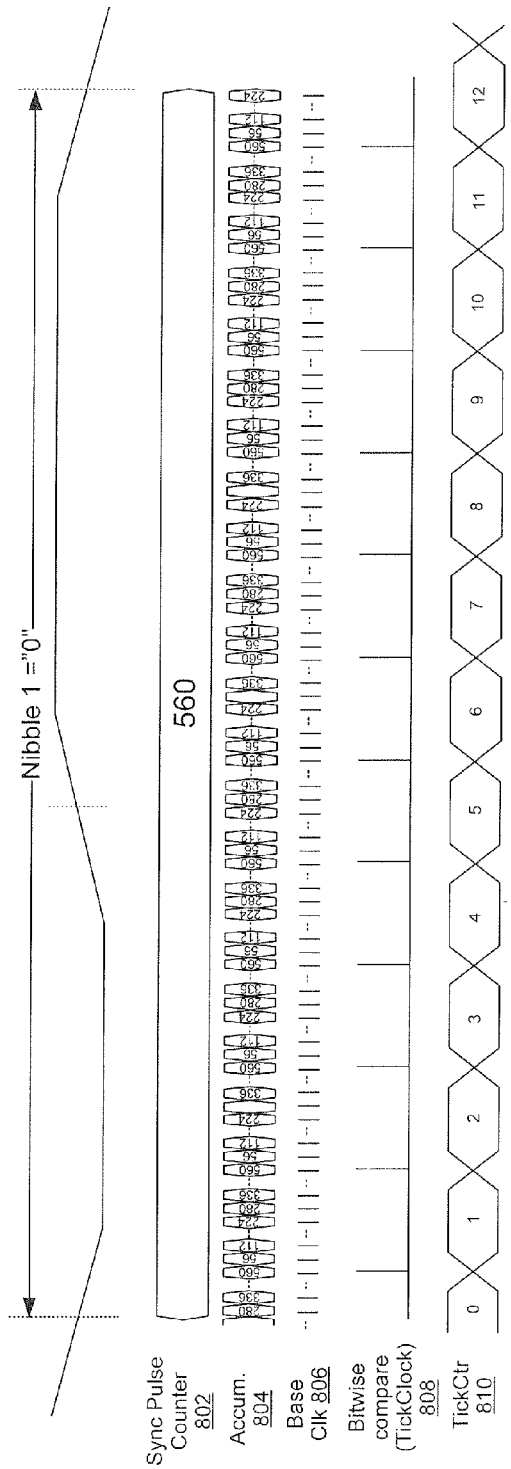

Turning now to FIG. 7-8, one can see a more detailed view of the first data transmission unit 602 from FIG. 6. At the beginning of the first data transmission unit, the receiver receives a sync pulse having a duration of 168 μs. To determine this sync pulse duration, the receiver counts the number of base clocks in the sync pulse. In this example, the receiver counts 560 periods of the base clock, which can be accomplished by using a sync pulse counter (e.g., as shown in FIG. 4).

FIG. 8 shows a more detailed view of how the receiver can decode a data pulse (e.g., Nibble 1 from FIG. 7). As shown, a sync pulse counter 802 stores the number of base clock cycles in the sync pulse (560 in this example). At the start of the data pulse, the accumulator 804 is pre-set to one-half of the sync pulse count value (280 in this example). Then, at each pulse of the base clock 806, the accumulator value is increased by 56, which is the number of ticks per sync pulse.

A bitwise comparison between the stored sync pulse counter value 802 (a value of 560 in this example) and the accumulator output value 804 provides a tick clock 808 having a tick frequency. The tick counter 810 is incremented according to the tick frequency, such that the number of ticks in the data pulse is accurately determined (here 12 ticks in Nibble 1). The number of ticks in the data pulse can then be decoded, to yield a nibble value of "0" in this example. After the nibble value is decoded, the tick counter can be reset to 280 at the start of the next data pulse.

Figure 9:
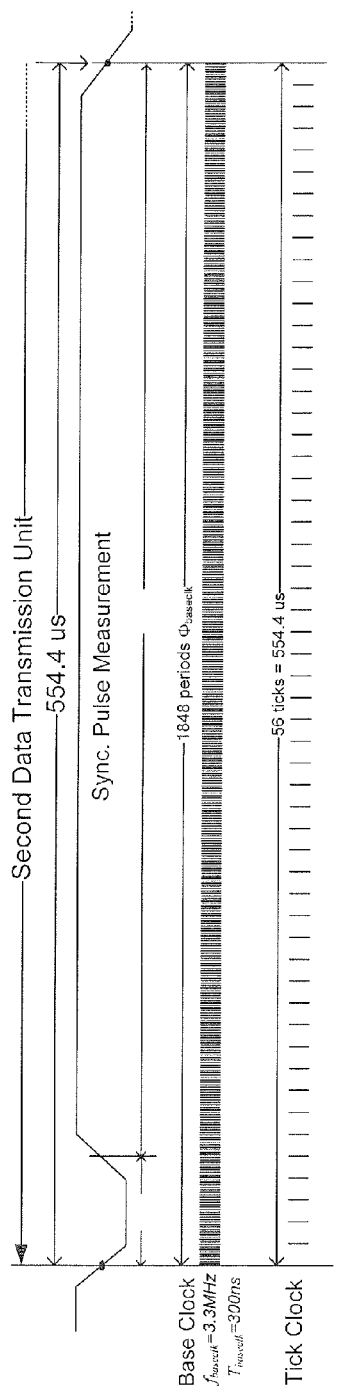
Figure 10:
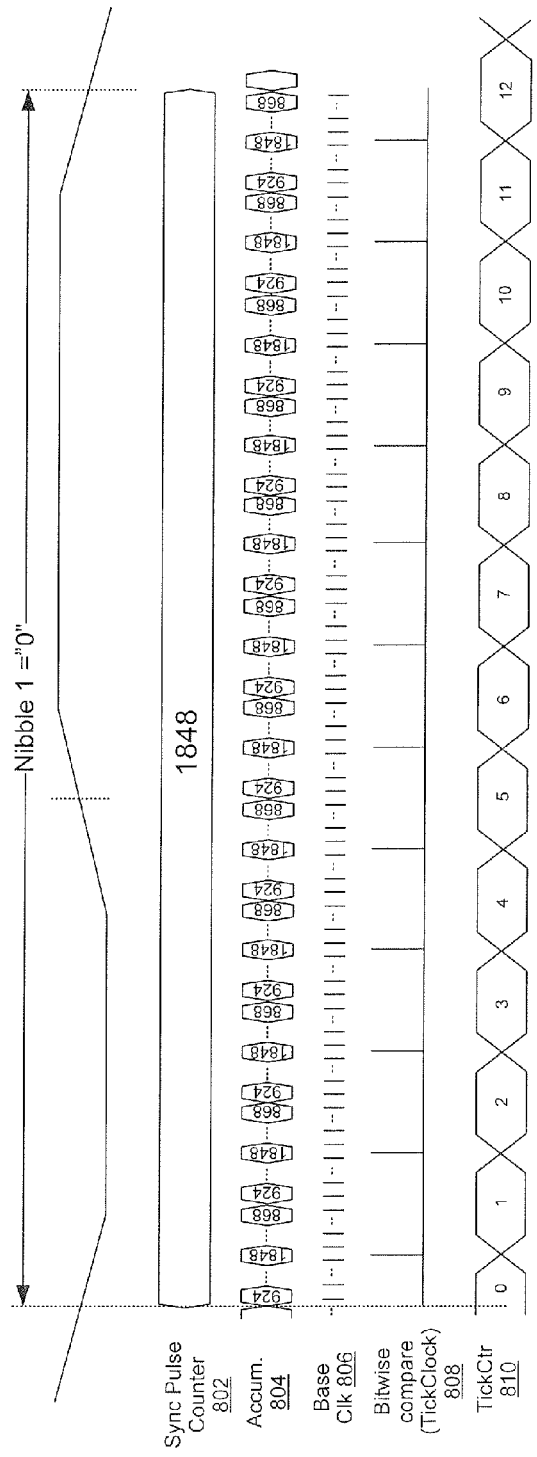

FIGS. 9-10 show a more detailed view of the second data transmission unit 604 from FIG. 6. In FIG. 8, one can see that for the second data transmission unit 604, the receiver receives a sync pulse having a duration of 554.4 μs. The receiver again counts the number of base clocks in the sync pulse. In this example, the receiver counts 1848 periods of the base clock. Notably, this longer duration means that ticks are spread further apart, which tends to lower the data rate.

FIG. 10 shows a more detailed view of how the sync pulse counter 802, accumulator 804, base clock 806, bitwise comparator 808, and tick counter 810 can help decode data pulses for the second data transmission unit 604 shown in FIG. 9. As shown, at the start of the first data pulse, the accumulator 804 can be set to one-half of the sync pulse count value (here 924). Then, at each base clock pulse, the accumulator value is increased by 56, which is the number of ticks per sync pulse. A bitwise comparison between the accumulator output value and the stored sync pulse counter value provides a tick clock having a tick frequency. Here, the tick frequency is lower than in FIG. 7-8, thereby reflecting a relatively low data rate. The tick counter is incremented according to the tick frequency, such that the number of ticks in the data pulse is accurately determined and decoded.

Although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements and/or resources), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. In addition, the articles "a" and "an" as used in this application and the appended claims are to be construed to mean "one or more".

Furthermore, to the extent that the terms "includes", "having", "has", "with", or variants thereof are used in either the detailed description or the claims, such terms are intended to be inclusive in a manner similar to the term "comprising."

What is claimed is:

1. A method, comprising:
   measuring a duration of a first synchronization pulse;
   determining a first time interval at which a fixed, predetermined number of ticks are equally spaced over the first synchronization pulse;
   measuring a duration of a first data pulse by periodically incrementing a tick count value at the first time interval during the entire duration of the first data pulse;
   correlating the tick count value at an end of the first data pulse to a first digital value encoded on the first data pulse;
   measuring a duration of a second synchronization pulse, where the duration of the second synchronization pulse differs from the duration of the first synchronization pulse; and
   determining a second time interval at which the fixed, predetermined number of ticks are equally spaced over the second synchronization pulse, the second time interval differing from the first time interval.

2. The method of claim 1, further comprising:
   measuring a duration of a second data pulse by periodically incrementing the tick count value at the second time interval during the entire duration of the second data pulse; and
   correlating the tick count value at an end of the second data pulse to a second multi-bit digital value encoded on the second data pulse.

3. The method of claim 1, where a tick is associated with a receiver tick window that is approximately centered about an expected transmitter tick time.

4. The method of claim 1, where the first digital value is a multi-bit value.

5. A receiver, comprising:
   a synchronization pulse measurement element adapted to receive separate synchronization pulses having different durations and determine a fixed, predetermined number of ticks spread over the duration of each of the synchronization pulses, wherein a given synchronization pulse has the fixed, predetermined number of ticks equally spread over its duration according to a tick frequency;
   a data pulse measurement element adapted to increment a tick counter at the tick frequency throughout a data pulse to determine a number of ticks in the data pulse; and
   a decoder adapted to correlate a tick counter value at an end of the data pulse to a multi-bit data value encoded on the data pulse.

6. The receiver of claim 5, wherein a tick is associated with a receiver tick window that is approximately centered about an expected transmitter tick time.

7. The receiver of claim 5, wherein the tick counter is set to a non-zero value at a start of the data pulse.

8. The receiver of claim 5, where the data pulse measurement element comprises a frequency generator to provide the tick frequency.

9. A receiver, comprising:
   a base clock generator adapted to provide a base clock signal at a base clock interval;
   a synchronization pulse measurement element adapted to determine how many base clock intervals correspond to a first duration of a first synchronization pulse in a first data transmission unit, wherein a fixed, predetermined number of ticks are equally spread over the first synchronization pulse according to a first tick frequency;
   where the synchronization pulse measurement element is further adapted to determine how many base clock cycles correspond to a second duration of a second synchronization pulse in a second data transmission unit, where the second duration differs from the first duration and where the fixed, predetermined number of ticks are equally spread over the second synchronization pulse according to a second tick frequency that differs from the first tick frequency;
   a tick frequency generator adapted to generate the first tick frequency during a first data pulse in the first data transmission unit; and
   a tick counter adapted to increment a tick counter value at the first tick frequency throughout the entire first data pulse, thereby determining a number of ticks in the first data pulse.

10. The receiver of claim 9, where the tick frequency generator comprises:
    an accumulator adapted to increment an accumulator value by the fixed, predetermined number of ticks at each base clock interval throughout the first data pulse; and
    a bitwise comparator adapted to compare the accumulator value to a number of clock intervals in the first synchronization pulse, and thereby provide a tick clock signal at the first tick frequency.

11. The receiver of claim 9:
    where the tick frequency generator is further adapted to generate the second tick frequency during a second data pulse in the second data transmission unit; and
    where the tick counter is further adapted to increment the tick counter value at the second tick frequency throughout the entire second data pulse, thereby determining a number of ticks in the second data pulse.

12. The receiver of claim 11, further comprising:
    a decoder adapted to correlate the number of ticks in the first and second data pulses to first and second multi-bit data values encoded in the first and data pulses, respectively.

13. A receiver, comprising:
    a synchronization pulse measurement element adapted to determine a duration of a synchronization pulse, wherein the synchronization pulse has a fixed, predetermined number of ticks that are equally spread over the synchronization pulse according to a tick frequency;
    a data pulse measurement element adapted to increment a tick counter at the tick frequency throughout a data pulse to determine a number of ticks in the data pulse; and
    a decoder adapted to correlate a tick counter value at an end of the data pulse to a multi-bit data value encoded on the data pulse;
    wherein the tick counter is set to a non-zero value at a start of the data pulse.

14. A receiver, comprising:
    a base clock generator adapted to provide a base clock signal at a base clock interval;

a synchronization pulse measurement element adapted to determine how many base clock intervals correspond to a first duration of a first synchronization pulse in a first data transmission unit, wherein a fixed, predetermined number of ticks are equally spread over the first synchronization pulse according to a first tick frequency;

a tick frequency generator adapted to generate the first tick frequency during a first data pulse in the first data transmission unit, the tick frequency generator comprising:

an accumulator adapted to increment an accumulator value by the fixed, predetermined number of ticks at each base clock interval throughout the first data pulse; and a bitwise comparator adapted to compare the accumulator value to a number of clock intervals in the first synchronization pulse, and thereby provide a tick clock signal at the first tick frequency; and a tick counter adapted to increment a tick counter value at the first tick frequency throughout the entire first data pulse, thereby determining a number of ticks in the first data pulse.

* * * * *